United States Patent Office 3,312,691
Patented Apr. 4, 1967

3,312,691
2,3,4,5-TETRAHYDRO-1-BENZAZEPIN-2-ONES
Lincoln Harvey Werner, Summit, N.J., assignor to Ciba Corporation, New York, N.Y., a corporation of Delaware
No Drawing. Filed Aug. 23, 1963, Ser. No. 304,262
8 Claims. (Cl. 260—239.3)

The present invention concerns benzoazacycloalkan-2-one compounds, especially 1-(R-methyl)-4-Ar-benzoazacycloalkan-1-ones, in which the azacycloalkane portion has from six to eight ring members and its aza-nitrogen represents the 1-position of the benzoazacycloalkan-2-one portion, R is a 2-(1,3-diaza-2-cycloalkenyl) radical having from five to seven ring members, and Ar is an aryl group, or salts thereof, as well as process for the preparation of such compounds.

More particularly, it relates to compounds having the following formula

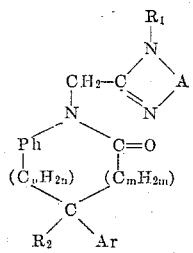

in which Ph is a 1,2-phenylene (or an o-phenylene) radical, Ar is an aryl radical, especially a carbocyclic aryl group or a heterocyclic aryl group, each of the groups $R_1$ and $R_2$ is hydrogen or lower alkyl, the group of the formula —$(C_mH_{2m})$— is lower alkylene separating the carbon atom carrying the groups Ar and $R_2$, from the carbonyl group by one carbon atom, the group of the formula —$(C_nH_{2n})$— is a direct bond or lower alkylene separating the group Ph from the carbon atom carrying the groups Ar and $R_2$ by at most two carbon atoms, and A is lower alkylene separating the two nitrogen atoms by two to four carbon atoms, and the salts thereof.

The benzo portion of the benzoazacycloalkan-2-one ring system, especially the 1,2-phenylene radical Ph, is unsubstituted or may be substituted by one or more than one of the same or of different groups which may substitute any of the positions available for substitution. Such substituents are, for example, aliphatic substituents, such as lower alkyl, e.g. methyl, ethyl, n-propyl, isopropyl, n-butyl, isobutyl, secondary butyl, tertiary butyl and the like, etherified hydroxyl, particularly lower alkoxy, e.g. methoxy, ethoxy, n-propyloxy, isopropyloxy and the like, as well as lower alkenyloxy, e.g. allyloxy and the like, lower alkylenedioxy, e.g. methylenedioxy, 1,1-ethylenedioxy and the like, or any other etherified hydroxyl group, esterified hydroxyl, such as halogeno (representing hydroxyl esterified by a hydrohalic acid), e.g. fluoro, chloro, bromo and the like, etherified mercapto, such as lower alkyl-mercapto, e.g. methylmercapto, ethylmercapto, n-propylmercapto, isopropylmercapto and the like, acyl, such as lower alkanoyl, e.g. acetyl, propionyl, n-butyryl, pivaloyl and the like, polyfluoro-lower alkyl, e.g. trifluoromethyl, 1,1,2,2,2-pentafluoro-ethyl and the like, as well as nitro, amino or substituted amino, such as N,N-di-lower alkyl-amino, e.g. N,N-dimethylamino, N,N-diethylamino and the like, or any other suitable substituent.

A substituted benzo portion of the benzoazacycloalkan-2-one ring system, especially a substituted 1,2-phenylene group Ph in the above formula, is particularly a (lower alkyl)-benzo portion, especially a (lower alkyl)-1,2-phenylene radical, an (etherified hydroxy)-benzo portion, especially an (etherified hydroxy)-1,2-phenylene radical, particularly a (lower alkoxy)-benzo portion, especially a (lower alkoxy)-1,2,-phenylene radical, a (lower alkenyloxy)-benzo portion, especially a (lower alkenyloxy)-1,2-phenylene radical, or a (lower alkylenedioxy)-benzo portion, especially a (lower alkylenedioxy)-1,2-phenylene radical, an (esterified hydroxy)-benzo portion, especially an (esterified hydroxy)-1,2-phenylene radical, such as a (halogeno)-benzo portion, especially a (halogeno)-1,2-phenylene radical, an (etherified mercapto)-benzo portion, especially an (etherified mercapto)-1,2-phenylene radical, such as a (lower alkyl-mercapto)-benzo portion, especially a (lower alkyl-mercapto)-1,2-phenylene radical, an (acyl)-benzo portion, especially an (acyl)-1,2-phenylene radical, such as a (lower alkanoyl)-benzo portion, especially a (lower alkanoyl)-1,2-phenylene radical, a (polyfluoro-lower alkyl)-benzo portion, especially a (polyfluoro-lower alkyl)-1,2-phenylene radical, or any other substituted benzo portion, especially substituted 1,2-phenylene radical.

The azacycloalkane portion of the benzoazacycloalkan-2-one ring system has from six to eight ring members. In the above formula, the group of the formula —$(C_mH_{2m})$— is a lower alkylene radical having preferably from one to four carbon atoms (the letter $m$ stands preferably for an integer from 1 to 4), and separating the carbon atom carrying the groups Ar and $R_2$ from the carbonyl group by one carbon atom, whereas the group of the formula —$(C_nH_{2n})$— is either a direct bond (i.e. the letter $n$ stands for 0) or a lower alkylene radical, having preferably from one to four carbon atoms (the letter $n$ stands preferably for an integer from 1 to 4), which separates the 1,2-phenylene group Ph from the carbon atom carrying the groups Ar and $R_2$ by at most two carbon atoms. A lower alkylene radical, represented in the above formula by the group —$(C_mH_{2m})$—, is above all methylene, but may also be 1,1-ethylene, 2,2-propylene, 1,1-butylene and the like, whereas a lower alkylene radical, represented in the above formula by the group —$(C_nH_{2n})$—, is methylene, 1,1-ethylene, 1,2-ethylene, 1-methyl-1,2-ethylene, 2-methyl-1,2-ethylene, 2,2-propylene, 2,3-butylene, 1,1-isobutylene and the like.

As indicated above, the 4-position of the benzoazacycloalkan-2-one ring system of the compounds of this invention is substituted by an aryl radical, such as a carbocyclic aryl radical or a heterocyclic aryl radical, represented in the above formula by the group Ar. A carbocyclic aryl radical is above all a monocyclic carbocyclic aryl radical, i.e. phenyl or substituted phenyl, as well as bicyclic carbocyclic aryl, i.e., naphthyl, e.g. 1-naphthyl or 2-naphthyl, or substituted naphthyl. The substituted phenyl or naphthyl radicals have one or more than one of the same or of different substituents, which may be attached to any of the positions available for substitution. Substituents are, for example, lower alkyl having from one to seven carbon atoms, e.g. methyl, ethyl, n-propyl, isopropyl, n-butyl and the like, lower alkoxy having from one to seven carbon atoms, e.g. methoxy, ethoxy, n-propyloxy, isopropyloxy and the like, or halogeno, e.g. fluoro, chloro, bromo and the like, as well as nitro, amino, N-lower alkyl-amino, in which lower alkyl has from one to seven carbon atoms, e.g. N-methylamino, N-ethylamino and the like, N,N-di-lower alkyl-amino, in which lower alkyl has from one to seven carbon atoms, e.g. N,N-dimethylamino, N-ethyl-N-methyl-amino, N,N-diethylamino and the like, N-acyl-amino, particularly N-lower alkanoyl-amino, in which lower alkanoyl has from one to seven carbon atoms, e.g. N-acetylamino, N-propionylamino and the like, polyfluoro-lower alkyl, e.g. trifluoromethyl and the like, or any other suitable substituent. A substituted phenyl radical is more especially (lower alkyl)-phenyl, (lower alkoxy)-phenyl, or (halogeno)-phenyl, as well as (nitro)-phenyl, (amino)-phenyl, (N-lower alkyl-amino)-phenyl, (N,N-di-lower alkyl-amino)-phenyl, (N-lower alkanoyl-amino)-phenyl, (polyfluoro-lower alkyl)-phenyl and the like; substituted naphthyl is, for example, (lower alkyl)-naphthyl, (lower alkoxy)-naphthyl or (halogeno)-naphthyl, as well as (nitro)-naphthyl, (amino)-naphthyl, (N-lower alkyl-amino)-naphthyl, (N,N-di-lower alkyl-amino)-naphthyl, (N-lower alkanoyl-amino)-naphthyl, (polyfluoro-lower alkyl)-naphthyl and the like. A heterocyclic aryl radical representing the group Ar is preferably a monocyclic heterocyclic aryl radical, such as a monocyclic azacyclic aryl radical, above all pyridyl, e.g. 3-pyridyl, 4-pyridyl and the like, as well as a monocyclic thiacyclic aryl radical, such as thienyl, e.g. 2-thienyl and the like, or a monocyclic oxacyclic aryl radical, such as furyl, e.g. 2-furyl and the like, or any other heterocyclic aryl radical.

The carbon atom representing the 4-position of the benzoazacycloalkan-2-one ring system carrying the aryl group Ar may contain no further substituent, but may have lower alkyl as an additional substituent. In the above formula, the group $R_2$ is above all hydrogen, but may also be lower alkyl, e.g. methyl, ethyl, n-propyl, isopropyl and the like.

The 2-(1,3-diaza-2-cycloalkenyl) radical R having from five to seven ring members and represented above by the partial formula

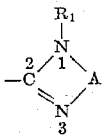

is more particularly a 2-imidazolinyl radical, but may also be a 2-(1,4,5,6-tetrahydro-pyrimidyl) or a 2-(1,3-diaza-2-cycloheptenyl) radical. Those carbon atoms of the 2-(1,3-aza-2-cycloalkenyl) radical, which are available for substitution, may be substituted, especially by lower alkyl, e.g. methyl, ethyl, n-propyl, isopropyl, n-butyl, tertiary butyl and the like, or any other suitable substituent. One of the aza-nitrogens carries a hydrogen atoms, which, if desired, may be replaced by lower alkyl, e.g. methyl, ethyl, n-propyl, isopropyl, n-butyl, secondary butyl and the like.

Thus, in the above partial formula, the group A stands for lower alkylene separating the two nitrogen atoms by from two to four carbon atoms, which may be unsubstituted or substituted, especially by lower alkyl; A is above all represented by 1,2-ethylene, but may also be 1-methyl-1,2-ethylene, 2-methyl-1,2-ethylene, 1,1-dimethyl-1,2-ethylene, 1,2-dimethyl-1,2-ethylene, 1-ethyl-1,2-ethylene, 1-isopropyl-1,2-ethylene, 1,3-propylene, 1-methyl-1,3-propylene, 2-methyl-1,3-propylene, 1,2-dimethyl-1,3-propylene, 2,2-dimethyl-1,3-propylene, 1,3-dimethyl-1,3-propylene, 1-ethyl-1,3-propylene, 2-isopropyl-1,3-propylene, 1,4-butylene, 1-methyl-1,4-butylene, 1,2-dimethyl-1,4-butylene, 1-n-propyl-1,4-butylene and the like, whereas the group $R_1$ is hydrogen, as well as lower alkyl.

Salts of the compounds of this invention are acid addition salts, such as the pharmaceutically acceptable, non-toxic acid addition salts with inorganic acids, e.g. hydrochloric, hydrobromic, sulfuric, phosphoric acids and the like, or with organc acids, such as organic carboxylic acids, e.g. formic, acetic, propionic, glycolic, malonic, succinic, maleic, hydroxy-maleic, fumaric, malic, tartaric, citric, benzoic, cinnamic, salicylic, 4-aminosalicylic, 2-phenoxybenzoic, 2-acetoxybenzoic acid and the like, or organic sulfonic acids, e.g. methane sulfonic, ethane sulfonic, 2-hydroxyethane sulfonic, ethane 1,2-disulfonic, benzene sulfonic, p-toluene sulfonic, naphthalene 2-sulfonic acid and the like. Other acid addition salts may be used as intermediates, for example, in the purification of the free compounds or in the preparation of other, for example, pharmaceutically acceptable acid addition salts, as well as for identification and characterization purposes. Acid addition salts, which are primarily used for the latter are, for example, those with acidic organic nitro compounds, e.g. picric, picrolonic, flavianic acid and the like, or with metal complex acids, e.g. phosphotungstic, phosphomolybdic, chloroplatinic, Reinecke acid and the like.

The new compounds of this invention have antifibrillatory properties and are, therefore, useful in the treatment of neurogenic or cardiogenic auricular or ventricular fibrillation. They also show antihistaminic and local anesthetic effects and are, therefore, used accordingly, i.e. as antihistaminic or local anesthetic agents. The above pharmacological effects, particularly the antifibrillatory properties, exhibited by the compounds of this invention are of prolonged duration.

Outstanding antifibrillatory properties are exhibited by compounds having the following formula

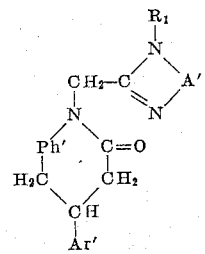

in which the group Ph′ is 1,2-phenylene, (lower alkyl)-1,2-phenylene, (lower alkoxy)-1,2-phenylene, or (halogeno)-1,2-phenylene or (trifluoromethyl)-1,2-phenylene, the group Ar′ is phenyl, (lower alkyl)-phenyl, (lower alkoxy)-phenyl, (halogeno)-phenyl, (trifluoromethyl)-phenyl or pyridyl, A′ stands for alkylene having from two to three carbon atoms and separating the two nitrogen atoms by from two to three carbon atoms, and $R_1$ is primarily hydrogen, as well as lower alkyl, or acid addition salts, particularly pharmaceutically acceptable, non-toxic acid addition salts, thereof.

The compounds of this invention are useful in the form of compositions for enteral, e.g. oral, or parenteral use, which consist essentially of a pharmacologically effective amount of one of the new compounds of this invention in admixture with a pharmaceutically acceptable, organic or inorganic, solid or liquid carrier. For making up the compositions, there are employed substances which do not react with the new compounds, such as water, gelatin, lactose, starches, stearic acid, magnesium stearate, talc, vegetable oils, benzyl alcohol, stearyl alcohol, gums, propylene glycol, polyalkylene glycols, or any other carrier materials suitable for making up such compositions. The latter may be in solid form, for example, as capsules, tablets, dragees and the like, or in liquid form, for example, as solutions, suspensions, emulsions and the like. If desired, they may contain auxiliary substances, such as preserving, stabilizing, wetting, emulsifying, coloring, flavoring agents and the like, salts for varying the osmotic pressure, buffers, etc. They may also contain, in combination, other useful substances.

The compounds of the present invention are prepared according to known methods. For example, a 4-Ar-benzoazacycloalkan-2-one compound, in which the azacycloalkane portion has from six to eight ring members, and its aza-nitrogen represents the 1-position of the benzoazacycloalkan-2-one portion, and Ar has the previously-given meaning, or preferably a salt thereof, may be treated with a reactive esterified R-methanol, in which R is a 2-(1,3-diaza-2-cycloalkenyl) radical, or a salt thereof, and, if desired, a resulting salt may be converted into the free compound or into another salt, and/or, if desired, a hydrogen atom attached to one of the aza-nitrogen atoms of the 2-(1,3-diaza-2-cycloalkenyl) radical in a resulting compound may be replaced by lower alkyl, and/or, if desired, converting a free compound into a salt thereof.

Salts of the 4-Ar-benzoazacycloalkan-2-one starting materials are metal salts, particularly the alkali metal, e.g. lithium, sodium or potassium, salts, as well as the alkaline earth metal salts thereof, or other salts, such as those formed with strong ammonium bases, for example, benzyl trimethyl ammonium hydroxide and the like. These salts are prepared according to known methods, for example, by reacting the free starting material with a metal, particularly an alkali metal, or, more especially, with an alkali metal hydride, amide or lower alcoholate, e.g. methanolate, ethanolate, tertiary butanolate and the like, in the presence of an appropriate diluent; these salts of the starting material are preferably used with the free reactive ester of the R-methanol.

The reactive esterified R-methanols used as the reagents in the above reaction are above all the esters of such alcohols with strong inorganic acids, particularly hydrohalic acids, e.g. hydrochloric, hydrobromic, hydriodic acid, or sulfuric acid, as well as those with strong organic acids, particularly strong organic sulfonic acids, such as lower alkane sulfonic acids or monocyclic carbocyclic aryl sulfonic acids, e.g. methane sulfonic, ethane sulfonic, 2 - hydroxy - ethane sulfonic, p-toluene sulfonic acid and the like. Salts of the reactive esters of R-methanols are addition salts with acids, such as those mentioned before, particularly the hydrohalic acids. These acid addition salts are preferably used with the free benzoazacycloalkan-2-one starting material, but may also be employed with a salt of the latter, if the reagent for the formation of such salts is used in excess amounts.

The reaction is carried out in the absence or in the presence of a diluent; the selection of the latter depends on the properties of the reagents. Thus, lower alkanols, e.g. methanol, ethanol and the like, may be used with the free benzoazacycloalkan - 2 - one starting material, whereas a salt of the latter may be reacted in the presence of an inert solvent, such as ether, e.g. diethyl ether, p-dioxane, tetrahydrofuran and the like, hydrocarbons, e.g. hexane, cyclohexane, benzene, toluene and the like, N,N-disubstituted amides, e.g. N,N-dimethylformamide and the like, or any suitable diluent or solvent mixture. If necessary, the reaction may be carried out while cooling or at an elevated temperature, in a closed vessel and/or in the atmosphere of an inert gas, e.g. nitrogen.

The starting materials used in the above procedure are prepared according to known methods; for example, they may be obtained by ring closure of the carboxylic acid halides, e.g. chlorides and the like, of o-amino-phenyl-alkane carboxylic acids, in which the alkyl portion separates the carboxyl group from the phenyl portion by from two to four carbon atoms and its β-carbon atom has an aryl group as a substituent. Furthermore, a benzocycloalkanone, in which the carbonyl group occupies the position adjacent to the benzo portion, and the cycloalkanone ring has from five to seven ring members, can be converted into the corresponding homo-aza compound according to known methods, for example, by reacting it with hydrazoic acid according to the Schmidt reaction.

The compounds of this invention may also be prepared, for example, by converting in a 1-(reactive functionally converted carboxy-methyl) - 4 - Ar-benzoazacycloalkan-2-one, in which the azacycloalkane portion has from six to eight ring members and its aza-nitrogen represents the 1-position of the benzoazacycloalkan-2-one portion, and Ar has the previously-given meaning, the reactive functionally converted carboxyl group into the group R having the previously-given meaning, and, if desired, carrying out the optional steps.

The reactive functionally converted carboxyl group in the starting material is above all a cyano group, as well as an imido-ether, an imido-thioether, an imido-halide, an amidino, an amido, a thioamido, an ester, or an acid halide grouping.

The conversion of the reactive functionally converted carboxyl group into the desired 2 - (1,3-diaza-2-cycloalkenyl) radical is carried out according to known methods. For example, the starting material is reacted with a lower alkylene diamine, in which the two amino groups are separated by two to four carbon atoms, or with a compound capable of being converted into such lower alkylene diamine by treatment with ammonia, or with a reactive N-substituted derivative of such lower alkylene diamine. The desired ring formation is carried out directly or in stages, if necessary, in the presence of a suitable reagent; furthermore, the process may be performed in such manner that a functional acid derivative is formed in the course of the reaction.

For example, whenever a 1 - (cyano-methyl) - 4-Ar-benzoazacycloalkan - 2 - one, representing the preferred starting material, is used and reacted directly with the lower alkylene diamine or with a derivative thereof, it is of advantage to perform the reaction in the presence of hydrogen sulfide, carbon disulfide and the like; in such reaction, the lower alkylene diamine may be used in the form of a salt thereof.

Compounds capable of being converted into a lower alkylene diamine by the reaction with ammonia, are, for example, the corresponding hydroxy-amino-alkanes, or especially the esters thereof, as well as dihalogeno-alkanes. Using these starting materials, the reaction is carried out in the presence of ammonia or an agent yielding ammonia.

The reactive N-substituted derivatives of the lower alkylene diamines used as the reagents in the above procedure are ureas, such as, for example, ethylene urea, propylene urea and the like.

To carry out the procedure in stages, the 1-(reactive functionally converted carboxy-methyl)-4-Ar-benzoazacycloalkan-2-one compound is reacted with the lower alkylene diamine to form the N-acyl compound, which is then ring-closed by elimination of water, for example, by using a dehydrating agent, such as calcium oxide and the like, or by desulfurization, for example, with a heavy metal oxide and the like.

The above reaction is carried out according to known methods; conditions depend largely on the choice of the starting material and the reagent. Thus, the reaction may be carried out in the absence or presence of a diluent, catalyst and/or condensing agent, if necessary, while cooling or at an elevated temperature, under increased pressure, and/or in the atmosphere of an inert gas, such as nitrogen. By-products, formed during the reaction, such as water, may be removed, for example, by azeotropic distillation. Furthermore, one of the reactants may be used in excess of the other.

The starting materials used in the above procedure are prepared according to known methods. For example, the salt of a 4-Ar-benzoazacycloalkan-2-one compound may be treated with a reactive esterified hydroxy-acetic acid or a reactive functionally converted acid derivative thereof; this reaction is carried out in a manner analogous to the one previously-described, involving treatment of a 4-Ar-benzoazacycloalkan-2-one compound or a salt thereof with a reactive ester of an R-methanol or a salt thereof. In any resulting compound a free carboxyl group or a reactive functionally converted carboxyl group may be converted into the desired reactive functionally converted carboxyl group according to methods known per se.

The 1-(reactive functionally converted carboxy-methyl)-4-Ar-benzoazacycloalkan-2-ones, in which the azacycloalkane portion has from six to eight ring members and its aza-nitrogen represents the 1-position of the benzoazacycloalkan-2-one ring system, and Ar has the previously-given meaning, are new and are intended to be included within the scope of the invention. These intermediates may be represented by the formula

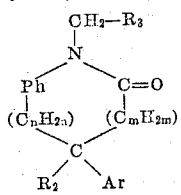

in which Ph, Ar, $R_2$ and the groups of the formulae —$(C_mH_{2m})$— and —$(C_nH_{2n})$— have the previously-given meaning, and $R_3$ represents a reactive functionally converted carboxyl group, especially one of the following groups:

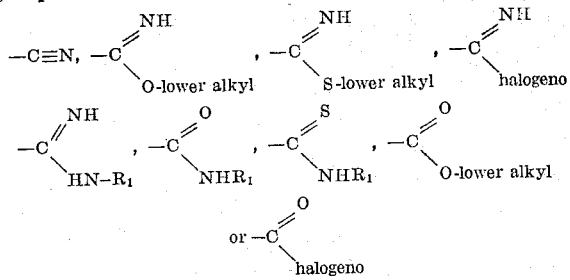

in which halogeno stands primarily for chloro, as well as bromo and the like, and $R_1$ has the above-given meaning, i.e. stands for hydrogen or lower alkyl. A preferred group of starting materials is represented by the formula

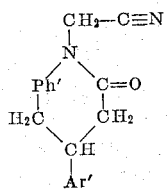

in which Ph' and Ar' have the previously-given meaning.

In a resulting compound, in which one of the nitrogen atoms of the 2-(1,3-diazo-2-cycloalkenyl) radical carries a hydrogen, such hydrogen may be replaced by lower alkyl according to known methods; for example, a 1-(R-methyl)-benzoazacycloalkan-2-one compound, in which R is an N-unsubstituted 2-(1,3-diaza-2-cycloalkenyl) radical, or a salt, such as an alkali metal salt, thereof, may be reacted with a reactive ester of a lower alkanol, for example, a lower alkyl halide, e.g. methyl, ethyl or isopropyl, chloride, bromide, or iodide and the like, or a di-lower alkyl sulfate, e.g. dimethyl sulfate, diethyl sulfate and the like.

A resulting salt may be converted into the free compound, for example, by treatment with an alkaline reagent, such as a metal hydroxide, e.g. sodium hydroxide, potassium hydroxide, calcium hydroxide and the like, a metal carbonate, e.g. sodium, calcium or potassium carbonate or hydrogen carbonate and the like, ammonia or any other alkaline reagent, as well as a suitable hydroxyl ion exchange preparation, etc.

A resulting salt may be converted directly into another salt; for example, a salt, especially an inorganic acid addition salt, may be reacted with a suitable metal, e.g. sodium, barium, silver and the like, salt of an acid, in a diluent, in which a resulting inorganic salt is insoluble and is thus removed from the reaction, or it may be treated with an anion exchange preparation.

A free compound may be converted into an acid addition salt thereof by reacting it or a solution thereof in a suitable solvent or solvent mixture with an acid, such as one of those described before, or a solution thereof, or with a suitable anion exchange preparation, and isolating the desired salt. A salt may be obtained in the form of a hydrate or may contain solvent of crystallization.

The invention also comprises any modification of the process wherein a compound formed as an intermediate at any stage of the process, is used as starting material and the remaining step(s) of the process is(are) carried out, or the process is discontinued at any stage, or in which the starting materials are formed in the course of the reaction. Also included within the scope of the present invention are any new intermediates, such as, for example, those mentioned hereinbefore.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

Example 1

To a solution of 2.0 g. of 4-phenyl-2,3,4,5-tetrahydro-1-benzazepin-2-one in 25 ml. of N,N-dimethylformamide is added 0.75 g. of a 55 percent suspension of sodium amide in xylene. The reaction mixture is stirred for one hour at room temperature and is then reacted while stirring with a solution of 1.1 g. of 2-chloromethyl-2-imidazoline in 18 ml. of benzene, which is added over a period of ten minutes; stirring at room temperature is continued overnight. The reaction mixture is filtered, the filtrate is evaporated under reduced pressure, the residue is dissolved in ethyl acetate, and the resulting solution is washed with water, dried and concentrated under reduced pressure to yield the free 1-[2-(2-imidazolinyl)-methyl] - 4- phenyl - 2,3,4,5 - tetrahydro - 1 - benzazepin-2-one of the formula

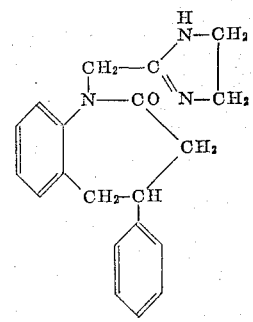

The residue is again dissolved in ethyl acetate, and the solution is treated with a concentrated solution of anhydrous hydrogen chloride in ethyl acetate. The amorphous 1 - [2 - (2-imidazolinyl)-methyl]-4-phenyl-2,3,4,5-tetrahydro-2-one hydrochloride precipitates (yield: 2.0 g.), and is reconverted into the free base by treatment with aqueous sodium hydroxide. The free compound is extracted with ethyl acetate; the solvent is evaporated and yields the 1-[2-(2-imidazolinyl)-methyl]-4-phenyl-2,3,4,5-tetrahydro-1-benzazepin-2-one in crystalline form, M.P. 153–154°. It is again converted into the hydrochloride, which could not be obtained in crystalline form and contains one-half mole of water, M.P. 100° (with decomposition).

The starting material is prepared as follows: To a solution of 15.0 g. of 3-phenyl-1,2,3,4-tetrahydro-naphthalen-1-one in 85 ml. of glacial acetic acid is added 5.5 g. of sodium azide while stirring. The reaction mixture is warmed to 35–40°, and treated dropwise with 16 ml. of concentrated sulfuric acid over a period of one hour and while maintaining a temperature of 35–40°. Stirring is continued for thirty minutes, and the temperature is then raised to 50° and maintained for one hour. Thereafter, the reaction mixture is stirred at room temperature for three hours and is then poured into 500 ml. of ice-water. The oily precipitate is extracted with ethyl acetate; the organic solution is washed with an aqueous solution of potassium carbonate and then with water, dried and evaporated under reduced pressure. The residue is treated with isopropanol and allowed to crystallize. The resulting 4-phenyl-2,3,4,5-tetrahydro-1-benzazepin-2-one melts at 142–144° after recrystallization from isopropanol; yield: 6.5 g.

*Example 2*

A mixture of 6.0 g. of 1-cyanomethyl-4-phenyl-2,3,4,5-tetrahydro-1-benzazepin-2-one, 1.8 g. of anhydrous ethylene diamine and three drops of carbon disulfide is heated to 110–130° for three to four hours. After cooling, 25 ml. of ethanol is added and evaporated under reduced pressure to remove the excess of ethylenediamine; this procedure is repeated with 25 ml. of ethyl acetate. The residue is then taken up into 100 ml. of ethyl acetate; the solution is treated with a concentrated solution of anhydrous hydrogen chloride in ethyl acetate. The resulting precipitate is filtered off and dissolved in water; the aqueous solution is made basic with sodium hydroxide, and the free 1-[2-(2-imidazolinyl)-methyl]-4-phenyl-2,3,4,5-tetrahydro-1-benzazepin-2-one is extracted with ethyl acetate. The organic solution is washed with water, dried and concentrated under reduced pressure. Upon treatment with a saturated solution of hydrogen chloride in ethyl acetate, the 1-[2-(2-imidazolinyl)-methyl]-4-phenyl-2,3,4,5-tetrahydro-1-benzazepin-2-one hydrochloride precipitates and is reconverted into the free compound, M.P. 153–154°, according to the procedure of Example 1.

A solution of the 1-[2-(2-imidazolinyl)-methyl]-4-phenyl-2,3,4,5-tetrahydro - 1 - benzazepin-2-one, when treated with picric acid, yields the 1-[2-(2-imidazolinyl)-methyl]-4-phenyl - 2,3,4,5 - tetrahydro-1-benzazepin-2-one picrate.

The starting material used in the above procedure is prepared as follows: To a solution of 5.8 g. of 4-phenyl-2,3,4,5-tetrahydro-1-benzazepin-2-one in 50 ml. of N,N-dimethylformamide is added 0.8 g. of sodium amide (in the form of a 55 percent suspension in toluene). The reaction mixture is stirred for one hour at room temperature and is then treated dropwise with 1.6 g. of chloroacetonitrile in 25 ml. of benzene. After stirring overnight at room temperature, the reaction mixture is filtered, the filtrate is concentrated under reduced pressure and the residue is taken up in ethyl acetate. The organic solution is washed with water, dried and concentrated to yield the crude 1-cyanomethyl-4-phenyl-2,3,4,5-tetrahydro-1-benzazepin-2-one of the formula

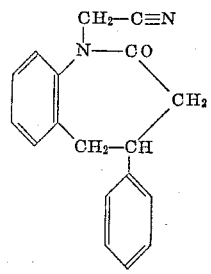

which is used without further purification.

Other compounds prepared according to the procedure of this invention are, for example, 4-(4-chloro-phenyl)-1-[2-(2-imidazolinyl) - methyl] - 2,3,4,5 - tetrahydro-1-benzazepin - 2 - one, 1-[2-(2-imidazolinyl)-methyl]-4-(4-methyl-phenyl) - 2,3,4,5 - tetrahydro-1-benzazepin-2-one, 4-(3,4-dimethoxy-phenyl) - 1 - [2 - (2 - imidazolinyl)-methyl] - 2,3,4,5 - tetrahydro - 1 - benzazepin - 2 - one, 4-phenyl - 1 - [2-(1,4,5,6-tetrahydro-pyrimidyl)-methyl]-2,3,4,5-tetrahydro - 1 - benzazepin-2-one, 1-[2-(1-methyl-2-imidazolinyl)-methyl] - 4 - methyl - 4 - phenyl-2,3,4,5-tetrahydro - 1 - benzazepin - 2 - one, 1-[2-(4-methyl-2-imidazolinyl) - methyl] - 3 - methyl-4-(4-fluorophenyl)-2,3,4,5 - tetrahydro - 1 - benzazepin-2-one, 7-chloro-1-[2-(2-imidazolinyl)-methyl] - 4 - phenyl - 2,3,4,5 - tetrahydro - 1 - benzazepin-2-one, 8-chloro-1-[2-(2-imidazolinyl)-methyl] - 4 - phenyl-2,3,4,5-tetrahydro-1-benzazepin-2-one, 1-[2-(2-imidazolinyl)-methyl] - 8 - methyl-4-phenyl-2,3,4,5-tetrahydro - 1 - benzazepin-2-one, 6,7-dimethoxy - 1 - [2-(2-imidazolinyl)-methyl] - 4 - phenyl-2,3,4,5-tetrahydro-1-benzazepin - 2 - one, 1-[2-(1,3-diaza-2-cyclopentenyl)-methyl] - 4 - phenyl-2,3,4,5-tetrahydro-1-benzazepin - 2 - one, 1-[2-(2-imidazolinyl)-methyl]-4-phenyl-1,2,3,4-tetrahydro-quinolin - 2 - one, 4-(4-chloro-phenyl) - 1 - [2-(2-imidazolinyl)-methyl]-1,2,3,4-tetrahydro-quinolin - 2 - one, 1-[2-(2-imidazolinyl)-methyl]-4-phenyl - 1,2,3,4,5,6 - hexahydro - 1 - benzazepin-2-one, 1-[2-(2-imidazolinyl)-methyl] - 4 - (3-pyridyl)-2,3,4,5-tetrahydro-1-benzazepin-2-one and the like.

*Example 3*

Pharmaceutical compositions containing one of the above 1-(R-methyl)-4-Ar-benzoazacycloalkan - 2 - one compounds, in which R and Ar have the previously-given meaning, or a pharmaceutically acceptable acid addition salt thereof as the pharmacologically active ingredient, are prepared according to standard procedures. They contain a pharmacologically effective amount of the active compound together with a pharmaceutically acceptable carrier; usually, the carrier represents the major portion of a pharmaceutical preparation, which consists essentially of from about 1 percent to at most 50 percent of the active ingredient.

Pharmaceutical compositions for oral use have from about 0.01 g. to about 0.1 g. of a 1-(R-methyl)-4-Ar-benzoazacycloalkan-2-one compound, in which R and Ar have the previously-given meaning, or a pharmaceutically acceptable acid addition salt thereof as the pharmacologically active ingredient per single dosage unit, together with a pharmaceutically acceptable solid carrier.

Tablets, each containing 0.05 g. of 1-[2-(2-imidazolinyl)-methyl]-4-phenyl - 2,3,4,5 - tetrahydro-1-benzazepin-2-one hydrochloride, are prepared as follows (for 500,000 tablets):

| Ingredients: | G. |
|---|---|
| 1 - [2 - (2 - imidazolinyl) - methyl]-4-phenyl - 2,3,4,5 - tetrahydro - 1 - benzazepin-2-one hydrochloride | 25,000.0 |
| Lactose S.D. | 106,845.0 |
| Corn starch | 3,850.0 |
| Corn starch (for paste) | 2,860.0 |
| Confectioner's sugar | 10,000.0 |
| Stearic acid | 1,445.0 |
| Purified water, q.s. | |
| Alcohol anhydrous 3A, q.s. | |

The 1-[2-(2-imidazolinyl)-methyl] - 4 - phenyl-2,3,4,5-tetrahydro-1-benzazepin-2-one hydrochloride is mixed with an equal portion of lactose; the mixture is passed through a No. 16 screen on a Fitzmill at medium speed and placed into a mixer. The remainder of the lactose, the 3,850.0 g. of corn starch, the confectioner's sugar and the stearic acid are added, and the powder is mixed for twenty minutes. The 2,860.0 g. of corn starch is suspended in cold water and a paste is formed by diluting the mixture with 14,000 ml. of boiling water. The paste is then added to the dry powder mixture to form the granulate; granulation is completed by adding 1,000 ml. of a 1:1-mixture of the 3A alcohol and water. The wet mass is passed through a No. 5 screen on the Fitzmill at low speed, dried on trays at about 43° and then broken on a No. 12 screen. The granulate is compressed into tablets weighing 0.3 g., using 11/32 inch dies and standard concave punches.

A solution for parenteral administration contains from about 0.1 g./ml. to about 0.1 g./ml. of a 1-(R-methyl)-4-Ar-benzoazacycloalkan-2-one compound, in which R and Ar have the previously-given meaning, or a pharmaceutically acceptable acid addition salt thereof as the pharmacologically active ingredient, together with a pharmaceutically acceptable liquid carrier.

A solution for injection containing 0.02 g./ml. of 1-[2-(2-imidazolinyl)-methyl]-4-phenyl-2,3,4,5-tetrahydro-1-benzazepin-2-one hydrochloride is prepared as follows (for 1,000 ml.):

Ingredients:
1-[2-(2-imidazolinyl)-methyl]-4-phenyl-
  2,3,4,5-tetrahydro-1-benzazepin-2-one
  hydrochloride _____ g__ 20.00
Sodium chloride _____ g__ 7.07
Water for injection, q.s. _____ ml__ 1,000.00

The 1-[2-(2-imidazolinyl)-methyl]-4-phenyl-2,3,4,5-tetrahydro-1-benzazepin-2-one hydrochloride is dissolved in 950 ml. of water for injection, the solution is heated to 40°, and the sodium chloride is added. The solution is cooled to 25°, and the volume is brought to 1000.00 ml. by adding the necessary amount of water. Throughout the procedure aseptic techniques are used, and the solution is filtered through a sterile filter into a 2,000 ml. flask, and 2.2 ml. of the solution is filled into 2 ml. amber ampules which are sealed and inspected.

What is claimed is:

1. A member selected from the group consisting of a compound of the formula

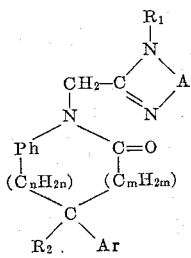

in which Ph is a member selected from the group consisting of 1,2-phenylene, (lower alkyl)-1,2-phenylene, (lower alkoxy)-1,2-phenylene, (lower alkenyloxy)-1,2-phenylene, (lower alkylenedioxy)-1,2-phenylene, (halogeno)-1,2-phenylene, (lower alkylmercapto)-1,2-phenylene, (lower alkanoyl)-1,2-phenylene and (polyfluoro-lower alkyl)-1,2-phenylene, each of $(C_nH_{2n})$ and $(C_mH_{2m})$ is lower alkylene separating the adjacent carbon atoms by one carbon atom, Ar is a member selected from the group consisting of phenyl, (lower alkyl)-phenyl, (lower alkoxy)-phenyl, (halogeno)-phenyl, (nitro)-phenyl, (amino)-phenyl, (lower alkylamino)-phenyl, (di-lower alkylamino)-phenyl, (lower alkanoyl)-phenyl, (polyfluoro-lower alkyl)-phenyl, pyridyl, thienyl and furyl, each of $R_1$ and $R_2$ is a member selected from the group consisting of hydrogen and lower alkyl and A is lower alkylene separating the adjacent nitrogen atoms by 2 to 4 carbon atoms, and an acid addition salt thereof.

2. A member selected from the group consisting of a compound of the formula

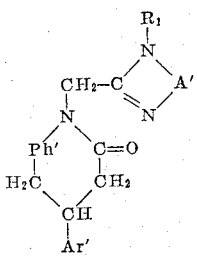

in which Ph' is a member selected from the group consisting of 1,2-phenylene, (lower alkyl)-1,2-phenylene, (lower alkoxy)-1,2-phenylene, (halogeno)-1,2-phenylene and (trifluoromethyl)-1,2-phenylene, the group Ar' is a member selected from the group consisting of phenyl, (lower alkyl)-phenyl, (lower alkoxy)-phenyl, (halogen)-phenyl, (trifluoromethyl)-phenyl and pyridyl, A' is alkylene having from two to three carbon atoms and separating the two nitrogen atoms by from two to three carbon atoms, and $R_1$ is a member selected from the group consisting of hydrogen and lower alkyl, and an acid addition salt thereof.

3. 1-[2-(2-imidazolinyl)-methyl]-4-phenyl-2,3,4,5-tetrahydro-1-benzazepin-2-one.

4. An acid addition salt of 1-[2-(2-imidazolinyl)-methyl]-4-phenyl-2,3,4,5-tetrahydro-1-benzazepin-2-one.

5. 1-[2-(2-imidazolinyl)-methyl]-4-phenyl-2,3,4,5-tetrahydro-1-benzazepin-2-one hydrochloride.

6. A compound of the formula

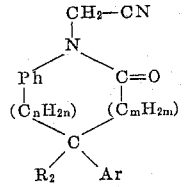

in which Ph is a member selected from the group consisting of 1,2-phenylene, (lower alkyl)-1,2-phenylene, (lower alkoxy)-1,2-phenylene, (lower alkenyloxy)-1,2-phenylene, (lower alkylenedioxy)-1,2-phenylene, (halogeno)-1,2-phenylene, (lower alkylmercapto)-1,2-phenylene, (lower alkanoyl)-1,2-phenylene and (polyfluoro-lower alkyl)-1,2-phenylene, each of $(C_nH_{2n})$ and $(C_mH_{2m})$ is lower alkylene separating the adjacent carbon atoms by one carbon atom, Ar is a member selected from the group consisting of phenyl, (lower alkyl)-phenyl (lower alkoxy)-phenyl, (halogeno)-phenyl, (nitro)-phenyl, (amino)-phenyl, (lower alkylamino)-phenyl, (di-lower alkylamino)-phenyl, (lower alkanoyl)-phenyl, (polyfluoro-lower alkyl)-phenyl, pyridyl, thienyl and furyl and $R_2$ is a member selected from the group consisting of hydrogen and lower alkyl.

7. A compound of the formula

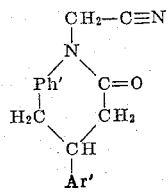

in which Ph' is a member selected from the group consisting of 1,2-phenylene, (lower alkyl)-1,2-phenylene, (lower alkoxy)-1,2-phenylene, (halogeno)-1,2-phenylene and (trifluoromethyl)-1,2-phenylene, and the group Ar' is a member selected from the group consisting of phenyl, (lower alkyl)-phenyl, (lower alkoxy)-phenyl, (halogeno)-phenyl, (trifluoromethyl)-phenyl and pyridyl.

8. 1-cyanomethyl-4-phenyl-2,3,4,5-tetrahydro-1-benzazepin-2-one.

References Cited by the Examiner

UNITED STATES PATENTS

| | | | |
|---|---|---|---|
| 2,538,342 | 1/1951 | Ullyot | 260—289 |
| 2,550,363 | 4/1951 | Luten et al. | 260—239.3 |
| 2,949,483 | 8/1960 | Ham | 260—239.3 |
| 3,023,214 | 2/1962 | Richter | 260—287 |
| 3,025,299 | 3/1962 | Pfister et al. | 260—289 |
| 3,045,008 | 7/1962 | Lombardino et al. | 260—239.3 |
| 3,075,967 | 1/1963 | Krapcho | 260—239.3 |
| 3,096,142 | 7/1963 | Hartmark et al. | 260—239.3 |
| 3,108,108 | 10/1963 | Schellhammer et al. | 260—288 |

WALTER A. MODANCE, *Primary Examiner.*

JOHN D. RANDOLPH, N. S. MILESTONE, *Examiners.*

NATALIE TROUSOF, ROBERT T. BOND,
*Assistant Examiners.*